Dec. 29, 1942.  F. G. DA ROZA  2,306,428
WELDING HEAT CONTROL
Filed May 21, 1941   2 Sheets-Sheet 1

Inventor
Francis G. Da Roza
By Blackmore, Spencer & Flint
Attorneys

Patented Dec. 29, 1942

2,306,428

UNITED STATES PATENT OFFICE 2,306,428

WELDING HEAT CONTROL

Francis G. da Roza, Ferndale, Mich., assignor to General Motors Corporation, Detroit, Mich., a corporation of Delaware Application May 21, 1941, Serial No. 394,524

6 Claims. (Cl. 250—27)

This invention relates to control means and more specifically to means for controlling the available current passing through a load without in any way affecting the incoming voltage from the source. As is well-known, in welding machines it is necessary to accurately control the amount of current that passes to each specific weld. There are in the main four different time periods per weld which are usually identified as: the "off time," when the electrodes are separated and no material lies therebetween; the "delay time" during which material is clamped between the electrodes, but as yet no current is passed therethrough; the "weld time" during which current passes to make the weld; and, lastly, the "hold time" during which the material is still clamped between the electrodes but the current is no longer passed. This last time allows the material to cool and harden before the mechanical pressure thereon is removed.

It is of course well-known that the amount of heat per weld is quite critical, depending of course upon the thickness of the material, the type of weld, etc. The accurate timing means now used allows the number of cycles which are allowed to pass through the material per weld to be very accurately ascertained and controlled. However, there are some instances in which the amount of heat which is obtained from a single electrical cycle is more than that desired to perform a given weld, even though the number of cycles of electrical current may be cut down. It is therefore desirable to provide some means for reducing the amount of heat per cycle of electrical current used for welding.

It is therefore an object of my invention to provide means for controlling the amount of electrical energy or heat per cycle of electrical current used for welding.

It is a further object of my invention to provide means for easily controlling or adjusting the amount of current or heat per cycle of electrical current used for welding.

It is a still further object of my invention to provide simple, inexpensive means for controlling the current per cycle.

With the above and other objects in view, the embodiments of my invention will be best understood by reference to the following specification and claims and the illustrations in the accompanying drawings, in which:

Figure 1:
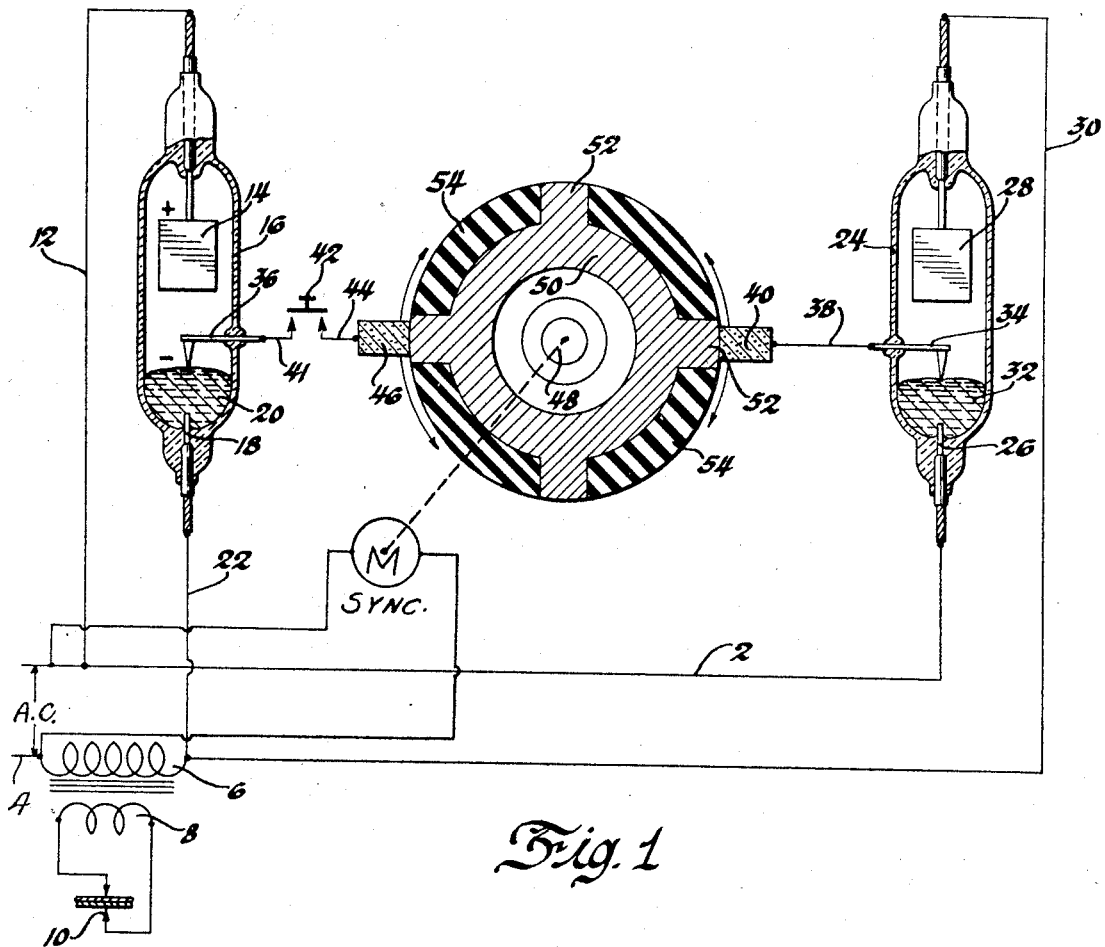
Figure 1 is a schematic diagram of a controlling means utilizing my invention.

Referring now more specifically to Figure 1, there is shown therein an incoming supply line 2 and 4, the primary 6 of a welding transformer being connected in series with line 4, the secondary 8 of said transformer being connected across welding electrodes 10 to complete the load circuit. Connected to line 2 is a line 12 which extends from the incoming line to the anode electrode 14 of an ignitron tube 16 and in the lower portion of said ignitron tube 16 is a second electrode 18 in contact with a mercury pool 20 and having connected thereto a lead 22 which extends to the opposite side of the transformer primary 6. Thus the ignitron is placed across the incoming line and transformer.

In parallel with the first ignitron tube is a second identical tube 24 having its lower electrode 26 connected to incoming line 2 and its positive electrode 28 connected to line 30 which extends to the transformer primary 6. It will therefore be noted that both of these ignitrons are connected across the line, but in opposite or back-to-back relation. The lower electrode 26 of the second ignitron 24 is of course in contact with the mercury pool 32 therein. Each of the ignitrons has a small igniter electrode 34 and 36 which is maintained just in contact with the mercury pool. The contact 34 of the ignitron 24 is connected by line 38 to a brush member 40, while the igniting electrode 36 of the ignitron 16 is connected by line 41 to a switch 42, the opposite terminal of which is connected by line 44 to a second diametrically spaced brush 46.

Between the two brushes there is rotatably supported commutator means for synchronous rotation with certain timing means usually applied to such apparatus. The commutator, as will be seen, rotates about an axis 48 and has a large central conducting section 50 having four poles 52 extending therefrom at each 90° of arcuate distance. Thus at each ¼ revolution of the commutator, the brushes 40 and 46 will be in contact with conducting means and current will be allowed to flow therethrough. Between the extending poles 52 are arcuate sectors 54 of insulating material. The resultant assembly therefore is a symmetrical, round commutator.

The switch labeled 42, and above referred to, is shown herein as being merely a manually operated switch. It may be, however, any one of the types of automatic switches usually applied to welding apparatus and capable of allowing current to flow for certain predetermined intervals in the complete welding cycle. My invention may thus be combined with any type of switching means and it was therefore not desired to illustrate any but the broadest type of switch herein.

Assuming now that the apparatus is in the condition above described, the voltage across the ignitrons is insufficient to cause current to flow between the anode and the cathode or mercury pool. The synchronous motor driving the commutator is rotating at 1800 R. P. M. and therefore has a periodicity of two cycles. It is first therefore to be understood that current will only pass through the ignitrons in one direction and therefore since they are connected in reverse or back-to-back relation, only one will fire or pass current at a time. Let us assume now that switch 42 is closed; current passes from line 2 to electrode 26, mercury pool 32, electrode 34, line 38, brush 40, commutator 50, brush 46, line 44, switch 42, line 41, igniter 36, mercury pool 20, electrode 18, line 22, transformer primary 6 to incoming line 4. In other words, the two igniters are in series across the line. The mercury in one of the ignitrons that for the moment has a positive anode, let us say ignitron 16, therefore forms a cathode spot and the tube becomes conductive and allows an arc to be struck between the mercury pool 20 and the anode 14. This causes a high surge of current through the transformer primary 6 and therefore a weld is performed between the welding electrodes 10. This tube will remain conductive until the current across the ignitron passes through zero and will then be broken and cannot be remade until the igniter is again energized and the anode positive. The current must lag the voltage sufficiently to enable the anode voltage to be high enough to cause tube conductance of course. In the next half cycle however the voltage will be in the reverse or negative direction to normal operation of this tube so that it is inactive.

At the same time however the second ignitron 24 will now be in condition to fire and the second half cycle will cause current to pass between the mercury pool 32 and the anode 28 of the second ignitron tube. This will be maintained again until the voltage goes to zero at which time the cycle will be repeated if the switch 42 is still closed. If it is not closed, then the ignitrons 16 and 24 will remain deenergized. Thus, if switch 42 is held down for one cycle of the supply current, tube 16 will fire for one half cycle and tube 24 for the second half cycle to provide current for the weld.

The point at which the ignitron tube fires is controlled entirely by the point at which voltage is applied to the igniter electrode. Thus by moving the brushes 46—40 circumferentially around the commutator section we may control the point in the electrical cycle at which the tube can fire. If the firing point is made substantially at the point of the voltage increase at the beginning of the cycle, then the control mechanism will supply substantially the full electrical cycle to the welding transformer and thus we will get substantially 100% of the heat available under the current curve. If, however, the brushes are shifted so that the ignitron does not fire until the voltage wave is fairly well advanced, it will still be broken at the same point, but the amount of energy transferable under the curve will be less.

Figure 2:
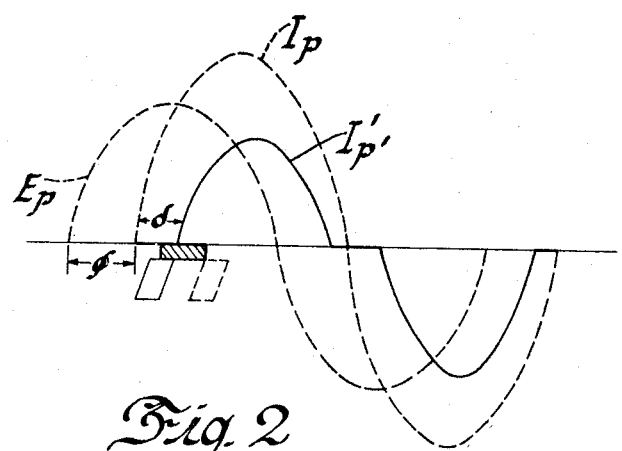
Figure 2 is a graph showing the current and voltage curves of one cycle for a welding machine.

This is perhaps best illustrated in Figure 2 in which the axis is shown and also the relative position of a brush member thereunder showing the angle of contact which the brush makes with the segment of the commutator. The first dotted line $E_p$ is the voltage curve of the primary circuit showing the usual sine wave of one complete electrical cycle. In this type of circuit current usually lags the voltage and therefore the shorter dash curve $I_p$ represents the current flowing in the circuit. In this instance the current is lagging by an angle $\alpha$ and let us assume that this represents the maximum current obtainable so that the current wave goes entirely from zero to maximum to zero in one cycle of the voltage. In this condition the brushes would be in the position shown in Figure 1 whereby the maximum current is induced as the voltage change is the greatest.

If now the brushes are rotated (counterclockwise in Figure 1 if the commutator is rotating in that direction) so that the current now lags by an additional angle $\delta$ the current curve will be as shown in solid lines $I'_{p'}$ and it will be noted that the area thereunder is substantially less than that under $I_p$. Thus by moving the brushes around to different positions whereby the current will be instigated at different positions with respect to the voltage wave, it has been possible by my invention to obtain areas under the current curve of some 95% down to 5%.

Figure 3:
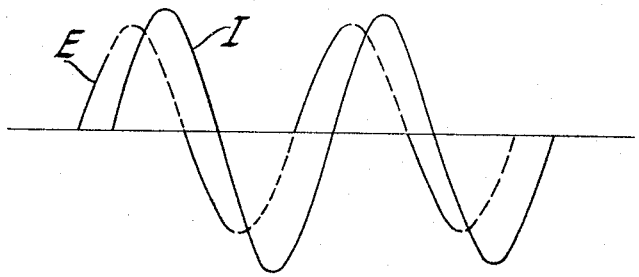
Figures 3, 4 and 5 show the current and voltage waves for various adjustments of my apparatus to provide different amounts of heat per cycle; and, Figure 6 shows the current curves for Figures 3, 4 and 5 superimposed to give a more accurate idea of their respective values.
Figure 4:
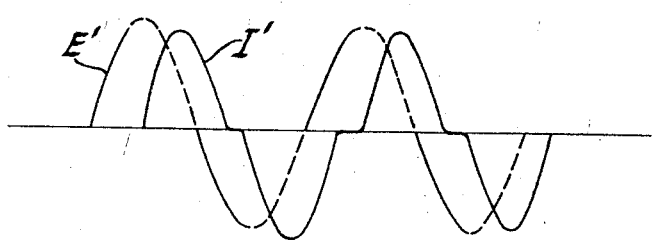
Figure 5:
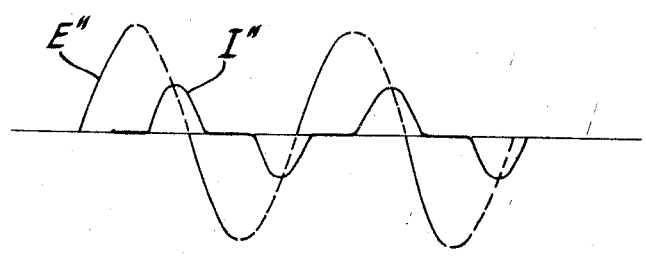
Figure 6:
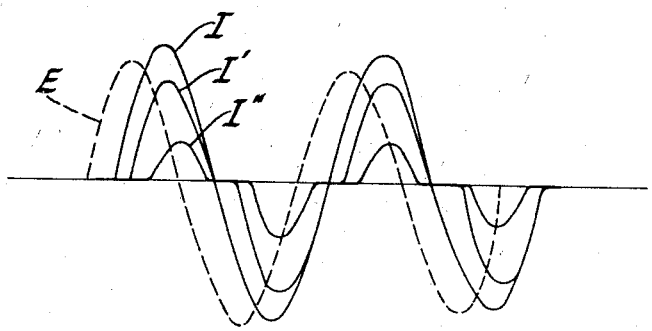

Referring now to Figure 3, we see here another time axis in which the first curve is the voltage wave labeled "E" and the second the current wave "I." These correspond with $E_p$ and $I_p$ in Figure 2 and show several cycles in which the current is maximum, or, let us say, 100%. This is maximum heat or area under the current curve which is obtainable with the present device. Let us assume in Figure 4 that the brushes 40—46 are now moved to a slightly delayed position, causing the ignitrons to fire at a point whereby the current is not allowed to flow until a later point in the cycle. Again the first curve is the voltage or E' curve and the second the current or I' curve, and in this instance it will be noted that the amplitude of the I' curve is much less than the I curve of Figure 3. Figure 5 shows a very substantial delay in the current or I" curve with respect to the E" curve and in this instance we only obtain approximately 8% of the curve area or heat that we would in the first curve of Figure 3. Figure 6 is merely a combination of the various curves of Figures 3, 4 and 5 superimposed showing how the area under the I curve decreases as the ignitrons are delayed from firing by movement of the brushes about the periphery of the commutator. The mechanical features of mounting the brushes so that they will be rotatable about the axis of the commutator are not important and any means for so mounting the brushes may be utilized.

The brush life of this apparatus is extremely long since there is substantially no sparking between the brushes and commutator when the brush moves off of the segment. This is due to the fact that the voltage across the tube is rather low at this time. Before the tube becomes conductive a high voltage is created between the anode and cathode of the tube, but as soon as the arc is formed therebetween the voltage across the tube drops to that of the arc which is approximately 15 volts and this is the potential which is present when the commutator leaves its associated segment and therefore substantially no arcing occurs and the brush life is long.

With my device, therefore, it is possible to vary the amount of current or heat obtainable from a single cycle or fraction thereof from substantially the whole or 95% down to 5% thereunder. This can be utilized with any type of timing mechanism which is substituted for the switch labeled "42" such as mechanical timers to allow only a cycle or cycle and one-half to be applied to a particular weld and may in many instances have its commutator driven from the same shaft as that which drives the timing mechanism. In this way substantially any amount of heat can be applied to a specific welding case from a very small amount to any amount desired.

This eliminates additional tubes for control, is quickly manipulated by an operator from his normal working position, allows the igniter rods to operate at cooler temperatures and prolongs the life thereof. The remainder of the apparatus has substantially no wear, and therefore long life.

I claim:

1. In control apparatus for welding machines, a welding transformer, a source of alternating current, a plurality of unidirectional conductance tubes connected in parallel between the transformer and the source in inverse relation whereby the tubes will operate to pass current on alternate half cycles and initiating means to start tube operation for each tube, said initiating means being connected in series with each other across the line and synchronous switching means connected in said last named series circuit.

2. In a control system, a load, a source of alternating current, a pair of mercury tubes connected in parallel between the source and the load in inverted relation, the peak voltage being insufficient to alone cause the tube to conduct current, igniter means for the tubes, brushes to which each igniter is connected, commutator means rotatable between the brushes synchronously driven from said source and means to shift the brushes about the periphery of the commutator to control the instant of conductivity of each tube.

3. In a control system, a load, a source of alternating current, a pair of mercury tubes, each having a mercury pool and a spaced anode connected between the source and the load in inverse relation to alternately control the current flowing to the load, the peak voltage being insufficient to alone cause conductance between the pool and anode, an igniter for each tube, a brush connected to each igniter, a commutator rotatable between the brushes synchronously driven from said source and controlling the initial conductivity of the tubes and means to shift the brushes circumferentially around the commutator to alter the point per cycle when the control tubes become conductive whereby the current may be made to flow at given periods after the initiation of the voltage curve and alter the length of the current cycle and thus the average heat supplied per cycle.

4. In control apparatus, a source of alternating current, a load, a plurality of electric discharge devices of the immersed ignition electrode type connected in inverse relation between the source and load, a circuit interconnecting the ignition electrodes and the source and a synchronous switching means connected into said interconnecting circuit whereby periods of energization of the ignition electrodes may be controlled.

5. In control apparatus, a source of alternating current, a load, a pair of electric discharge devices which are conductive in only one direction connected in inverse relation between the sources and the load whereby they will alternately conduct half cycles of current to the load, initiating means to start the discharge devices conducting for each tube, a common line interconnecting the two initiating means and a synchronously driven timed switching means connected in said common line for controlling the energization of each of the initiating means.

6. In control apparatus, a source of alternating current, a load, a pair of electric discharge devices which are conductive in only one direction connected in inverse relation between the source and the load whereby they will alternately conduct half cycles of current to the load, initiating means to start the discharge devices conducting for each tube, a common line interconnecting the two initiating means, a synchronously driven timed switching means connected in said common line for controlling the energization of each of the initiating means, and means connecting the synchronous drive to the source of alternating current whereby it would be in synchronism with the frequency of the current to the load.

FRANCIS G. DA ROZA.